US009464943B2

(12) United States Patent
Kishi et al.

(10) Patent No.: US 9,464,943 B2
(45) Date of Patent: Oct. 11, 2016

(54) TEMPERATURE SENSOR AND TEMPERATURE COMPENSATION OSCILLATOR (71) Applicant: FUJITSU LIMITED, Kawasaki-shi, Kanagawa (JP)

(72) Inventors: Masakazu Kishi, Kawasaki (JP); Masayuki Itoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 515 days.

(21) Appl. No.: 14/011,293

(22) Filed: Aug. 27, 2013

(65) Prior Publication Data

US 2014/0086276 A1 Mar. 27, 2014

(30) Foreign Application Priority Data

Sep. 21, 2012 (JP) .................. 2012-208127

(51) Int. Cl.
G01K 7/32 (2006.01)
(52) U.S. Cl.
CPC ...................... G01K 7/32 (2013.01)
(58) Field of Classification Search
USPC ..................... 374/117–119; 331/60
See application file for complete search history.

(56) References Cited

U.S. PATENT DOCUMENTS 3,899,746 A * 8/1975 Gammel ................. H03L 7/141
331/14
4,297,872 A * 11/1981 Ikeda ...................... G01K 11/26
374/117
4,615,041 A * 9/1986 Koskinen ............... H03K 5/135
327/231
4,872,765 A * 10/1989 Schodowski ............ G01K 7/32
310/318
2005/0184819 A1 8/2005 Oita et al.
2006/0176120 A1 8/2006 Satoh
2014/0086276 A1* 3/2014 Kishi ..................... G01K 7/203
374/172

FOREIGN PATENT DOCUMENTS

| JP | 60-130904 A | 7/1985 |
|----|-------------|--------|
| JP | 2-170607 | 7/1990 |
| JP | 2004-184256 | 7/2004 |
| JP | 2005-136552 | 5/2005 |
| JP | 2005-236801 | 9/2005 |
| JP | 2006-189312 | 7/2006 |

OTHER PUBLICATIONS

Japanese Office Action mailed May 17, 2016 for corresponding Japanese Patent Application No. 2012-208127, with Partial English Translation, 5 pages.

* cited by examiner

Primary Examiner — Minh Phan
Assistant Examiner — Leon W Rhodes, Jr.
(74) Attorney, Agent, or Firm — Fujitsu Patent Center (57) ABSTRACT A temperature sensor includes a resonator; a first oscillation circuit to oscillate the resonator in a first oscillation mode; a second oscillation circuit to oscillate the resonator in a second oscillation mode different from the first oscillation mode; a switching circuit to connect the resonator to the first oscillation circuit or the second oscillation circuit; a control circuit to control the switching circuit so that the first oscillation circuit and the second oscillation circuit are alternately connected to the resonator; and a temperature information output circuit to generate information representing a frequency difference between a signal output from the first oscillation circuit kept in a status of being connected to the resonator and a signal output from the second oscillation circuit kept in the status of being connected to the resonator on the basis of these signals and to output the frequency difference information as temperature information on the resonator.

6 Claims, 10 Drawing Sheets

RELATED ART

TEMPERATURE SENSOR AND TEMPERATURE COMPENSATION OSCILLATOR

CROSS-REFERENCE TO RELATED APPLICATION

This application is based upon and claims the benefit of priority of the prior Japanese Patent Application No. 2012-208127, filed on Sep. 21, 2012, the entire contents of which are incorporated herein by reference.

FIELD

The present invention relates to a temperature sensor and a temperature compensation oscillator.

BACKGROUND

As broadly known, normally a crystal oscillator (a circuit configured by a crystal resonator and an oscillation circuit) is used for an electronic apparatus such as a wireless communication apparatus and a computer, however, an oscillation frequency of the crystal resonator changes depending on a temperature. Therefore, a TCXO (Temperature Compensated Crystal Oscillator) incorporating the crystal resonator and a temperature compensation oscillation circuit into one package is used for the apparatus that particularly requires an accurate frequency.

The general TCXO is configured to compensate the temperature on the basis of a temperature (measured by a thermo-sensitive element provided in the vicinity of the crystal resonator) ambient to the crystal resonator, however, a crystal oscillator compensating the temperature on the basis of a temperature of the crystal resonator itself is also developed.

Figure 1:
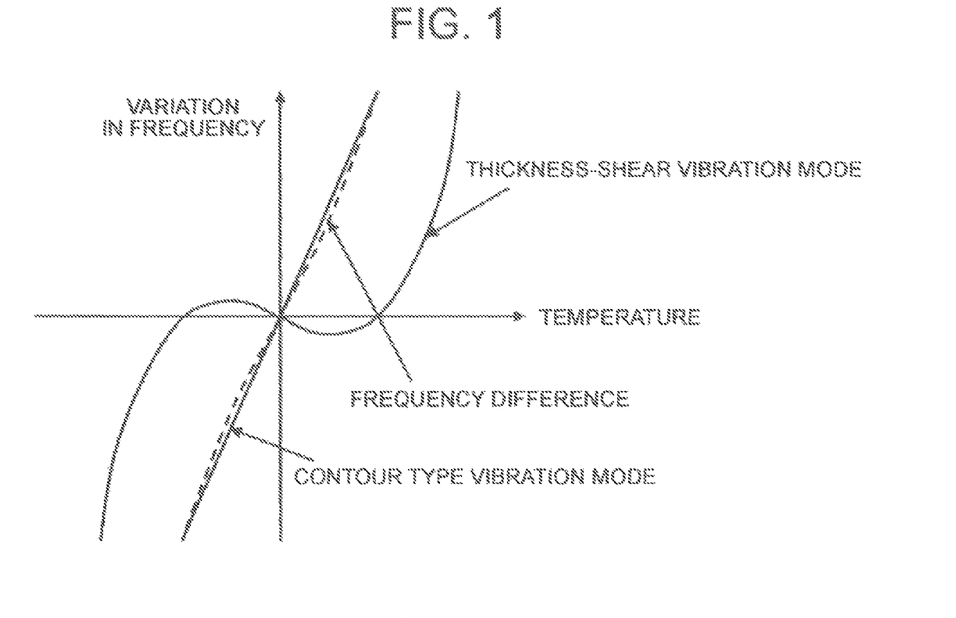
FIG. 1 is an explanatory diagram of frequency/temperature characteristics of a crystal resonator.

To be specific, as illustrated in FIG. 1, the crystal resonator has a plurality of vibration modes (a thickness-shear vibration mode and a contour type vibration mode in FIG. 1) with frequency temperature characteristics being different from each other. Accordingly, temperature information (that can be converted into the temperature of the crystal resonator) on the crystal resonator can be acquired by obtaining a difference between the oscillation frequencies in the two vibration modes of the crystal resonator.

Figure 2:
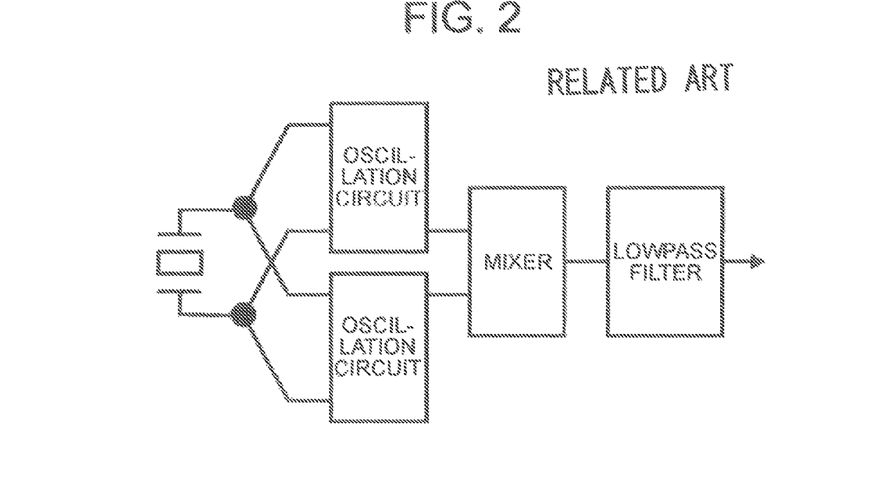
FIG. 2 is an explanatory diagram of a configuration for obtaining temperature information from an oscillation frequency difference in two vibration modes of the crystal resonator.

Therefore, as depicted in FIG. 2, a crystal oscillator (refer to, e.g., Patent document 1) is developed, which compensates the temperature by connecting two oscillation circuits to the crystal resonator, generating beat signal of outputs of the two oscillation circuits with a mixer, extracting a low frequency component containing the difference between the oscillation frequencies from the generated beat signal by use of a lowpass filter and obtaining the temperature information on the crystal resonator and thus compensating the temperature on the basis of the temperature information.

PRIOR ART REFERENCE

Patent document 1: Japanese Patent Application Laid-Open Publication No. 2005-236801
Patent document 2: Japanese Patent Application Laid-Open Publication No. 2006-189312
Patent document 3: Japanese Patent Application Laid-Open Publication No. 2004-184256
Patent document 4: Japanese Patent Application Laid-Open Publication No. 2005-136552

The temperature of the resonator itself can be acquired by obtaining the difference between the oscillation frequencies in the two vibration modes of the resonator such as the crystal resonator. Further, with this contrivance of obtaining the difference between the oscillation frequencies in the two vibration modes of the resonator, it follows that the temperature can be measured at higher accuracy than in the case of employing the thermo-sensitive element such as a thermocouple. In the case of vibrating the resonator simultaneously in the two vibration modes, it is difficult for none of interference to be caused between the two oscillation circuits (shared with one resonator), and hence the temperature information with the high accuracy cannot be obtained in many cases.

SUMMARY

According to an aspect of the embodiments, a temperature sensor includes:
a resonator;
a first oscillation circuit to oscillate the resonator in a first oscillation mode;
a second oscillation circuit to oscillate the resonator in a second oscillation mode different from the first oscillation mode;
a switching circuit to connect the resonator to the first oscillation circuit or the second oscillation circuit;
a control circuit to control the switching circuit so that the first oscillation circuit and the second oscillation circuit are alternately connected to the resonator; and
a temperature information output circuit to generate information representing a frequency difference between a signal output from the first oscillation circuit kept in a status of being connected to the resonator and a signal output from the second oscillation circuit kept in the status of being connected to the resonator on the basis of these signals and to output the frequency difference information as temperature information on the resonator.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In-depth descriptions of a few embodiments of the present invention will hereinafter be made with reference to the drawings.

First Embodiment

Figure 3:
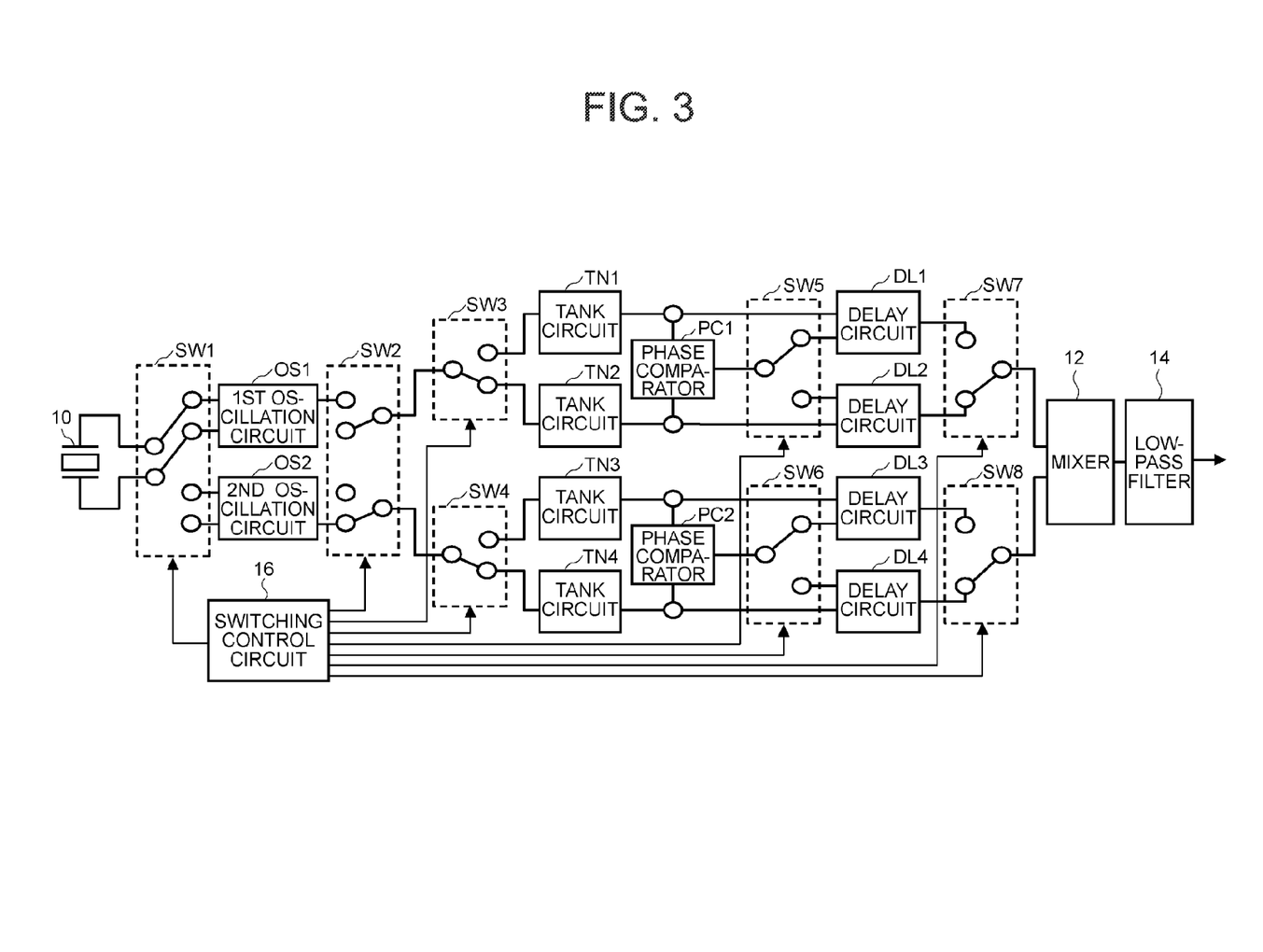
FIG. 3 is a diagram of a configuration of a temperature sensor according to a first embodiment.

FIG. 3 illustrates a configuration of a temperature sensor by way of a first embodiment of the present invention.

As depicted in FIG. 3, the temperature sensor according to the first embodiment includes a crystal resonator 10, eight number of switching circuits SW1 through SW8, a first oscillation circuit OS1, a second oscillation circuit OS2 and four number of tank circuits TN1 through TN4. The temperature sensor further includes two number of phase comparators PC1, PC2, four number of delay circuits DL1 through DL4, a mixer 12 and a lowpass filter ("lowpass") 14.

This temperature sensor is a sensor configured such that temperature information (containing information representing a temperature of the crystal resonator 10 and information that can be converted into the temperature of the crystal resonator 10) on the crystal resonator 10 is output from the lowpass filter 14.

The crystal resonator 10 is a generally-used crystal resonator (e.g., an AT-cut resonator) configured to have a plurality of vibration modes (oscillation modes). The first oscillation circuit OS1 is a circuit for vibrating (oscillating) the crystal resonator 10 in a first vibration mode (e.g., a contour type vibration mode); and the second oscillation circuit OS2 is a circuit for vibrating the crystal resonator 10 in a second vibration mode (e.g., a thickness-shear vibration mode) different from the first vibration mode.

The switching circuit SW1 is a circuit that connects the crystal resonator 10 to any one of the first oscillation circuit OS1 and the second oscillation circuit OS2. Note that a control signal is inputted to each of the switching circuits SWk (k=1 through 8) from a switching control circuit 16 (of which an in-depth description will be made later on). The switching circuit SW1 is configured as a circuit of which a status is changed at an interval of time T (e.g., several milliseconds) by the control signal.

As illustrated in FIG. 3, an output of the first oscillation circuit OS1 and an output of the second oscillation circuit OS2 are inputted to the switching circuit SW2.

The switching circuit SW2 is a switching circuit that can take the following two statuses.

A status where the output of the first oscillation circuit OS1 is supplied to a switching circuit SW3 (an output terminal of the first oscillation circuit OS1 is connected to a input terminal of the switching circuit SW3), while the output of the second oscillation circuit OS2 is not supplied to a switching circuit SW4 (an output terminal of the second oscillation circuit OS2 is not connected to whichever terminals); and a status where the output of the first oscillation circuit OS1 is not supplied to the switching circuit SW3, while the output of the second oscillation circuit OS2 is supplied to a switching circuit SW4 (the status illustrated in FIG. 3).

The switching circuit SW3 is a circuit that supplies a signal (the signal having a "0" level or the output signal of the first oscillation circuit OS1) coming from the switching circuit SW2 to any one of the tank circuit TN1 and the tank circuit TN2. The switching circuit SW4 is a circuit that supplies the signal coming from the switching circuit SW2 to any one of the tank circuit TN3 and the tank circuit TN4.

The tank circuits TN1 through TN4 are resonance circuits that continue to output the signals having the same frequency as the frequency of the signals inputted so far for a fixed period of time (longer than the time T) even when the inputs cease. As illustrated in FIG. 3, an output of the tank circuit TN1 is inputted to the phase comparator PC1 and the delay circuit DL1, and an output of the tank circuit TN2 is inputted to the phase comparator PC1 and the delay circuit DL2. Further, an output of the tank circuit TN3 is inputted to the phase comparator PC2 and the delay circuit DL3, and an output of the tank circuit TN4 is inputted to the phase comparator PC2 and the delay circuit DL4.

The delay circuits DLm, to which the outputs of the tank circuits TNm (m=1 through 4) are inputted, are the delay circuits capable of controlling (changing) the delay time by the control signal.

The phase comparator PC1 is a circuit that detects a phase difference between the output of the tank circuit TN1 and the output of the tank circuit TN2, and outputs the signal having a level corresponding to the detection result. The phase comparator PC2 is a circuit that detects a phase difference between the output of the tank circuit TN3 and the output of the tank circuit TN4, and outputs the signal having a level corresponding to the detection result. Note that the signal output by the phase comparator PC1 becomes, when supplied as the control signal to the delay circuit DL1 or DL2, a signal having such a level that the outputs of the two delay circuits DL1 and DL2 are in equiphase. Similarly, the signal output by the phase comparator PC2 becomes, when supplied as the control signal to the delay circuit DL3 or DL4, a signal having such a level that the outputs of the two delay circuits DL3 and DL4 are in equiphase.

A switching circuit SW5 is a circuit that supplies the signal output from the phase comparator PC1 as the control signal to the delay circuit DL1 or the delay circuit DL2. Further, a switching circuit SW6 is a circuit that supplies the signal output from the phase comparator PC2 as the control signal to the delay circuit DL3 or the delay circuit DL4.

A switching circuit SW7 is a circuit that supplies the output of the delay circuit DL1 or the delay circuit DL2 to the mixer 12, and a switching circuit SW8 is a circuit that supplies the output of the delay circuit DL3 or the delay circuit DL4 to the mixer 12.

The mixer 12 is a circuit that mixes the two signals inputted from the two switching circuits SW7 and SW8. Details thereof will be described later on, however, this mixer 12 always receives the input of the signal having the same frequency as the frequency of the output signal of a first oscillator (the crystal resonator 10 plus the first oscillation circuit OS1) and the input of the signal having the same frequency as the frequency of the output signal of a second oscillator (the crystal resonator 10 plus the second oscillation circuit OS2). Accordingly, it follows that beat signal of the output signals of the two oscillators are output from the mixer 12.

The lowpass filter 14 is a filter that removes components whose frequency is higher than a frequency difference between the output signals of the two oscillators from the beat signal of the output signals of the two oscillators, which are output from the mixer 12. Namely, a circuit configured by the mixer 12 and the lowpass filter 14 of the present temperature sensor is a circuit that outputs information (a low frequency component in the beat signal of the output signals of the two oscillators) representing the frequency difference between the output signals of the two oscillators.

A function of the switching control circuit 16 will hereinafter be described.

Figure 4:
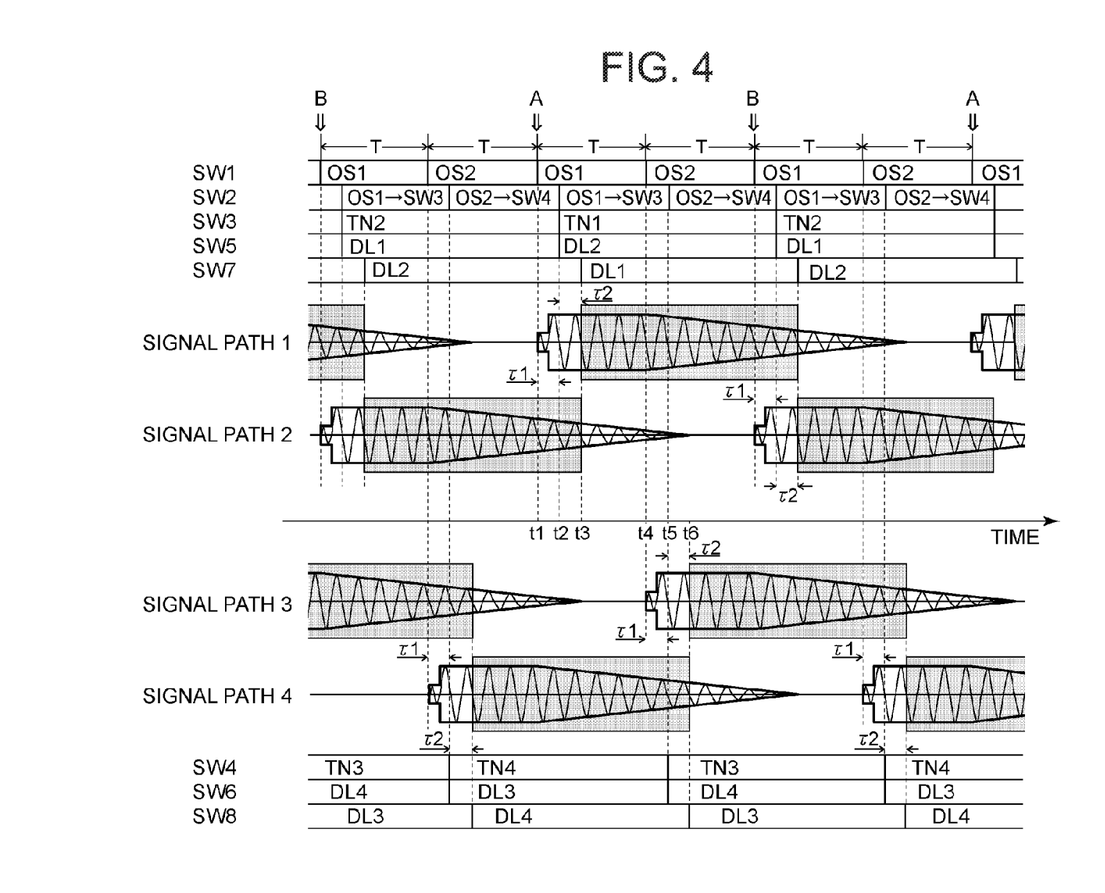
FIG. 4 is an explanatory diagram of contents of control over switching circuits of a switching control circuit provided in the temperature sensor according to the first embodiment.

FIG. 4 illustrates contents of the control over the respective switching circuits SWk (k=1 through 8) of the switching control circuit 16 and statues (waveforms) of the signals on the signal paths of the temperature sensor.

Note that the signal waveforms depicted as signal paths m (m=1 through 4) in FIG. 4 substantially correspond to waveforms of the output signals of the tank circuits TNm (or alternatively the waveforms of the output signals of the delay circuits DLm). The signal waveform in a time zone t1-t2 with respect to the signal path 1 and the signal waveform in a time zone t4-t5 with respect to the signal path 3 are not, however, the waveforms of the output signals of the tank circuits TN1/TN3 but are what schematically illustrates the waveforms of the unstable output signals of the oscillation circuit OS1 or OS2 defined as a connecting component immediately subsequent to the crystal resonator 10. Moreover, FIG. 4 illustrates partial time zones, indicated by halftone dot meshing, of the signals inputted to the mixer 12.

As already described, the switching control circuit 16 controls the switching circuit SW1 at the interval of the time T so as to change the connecting destination of the crystal resonator 10. On this occasion, however, as depicted in FIG. 4, the switching control circuit 16 controls only the switching circuit SW1 (so as to change only the status of the switching circuit SW1).

Figure 9:
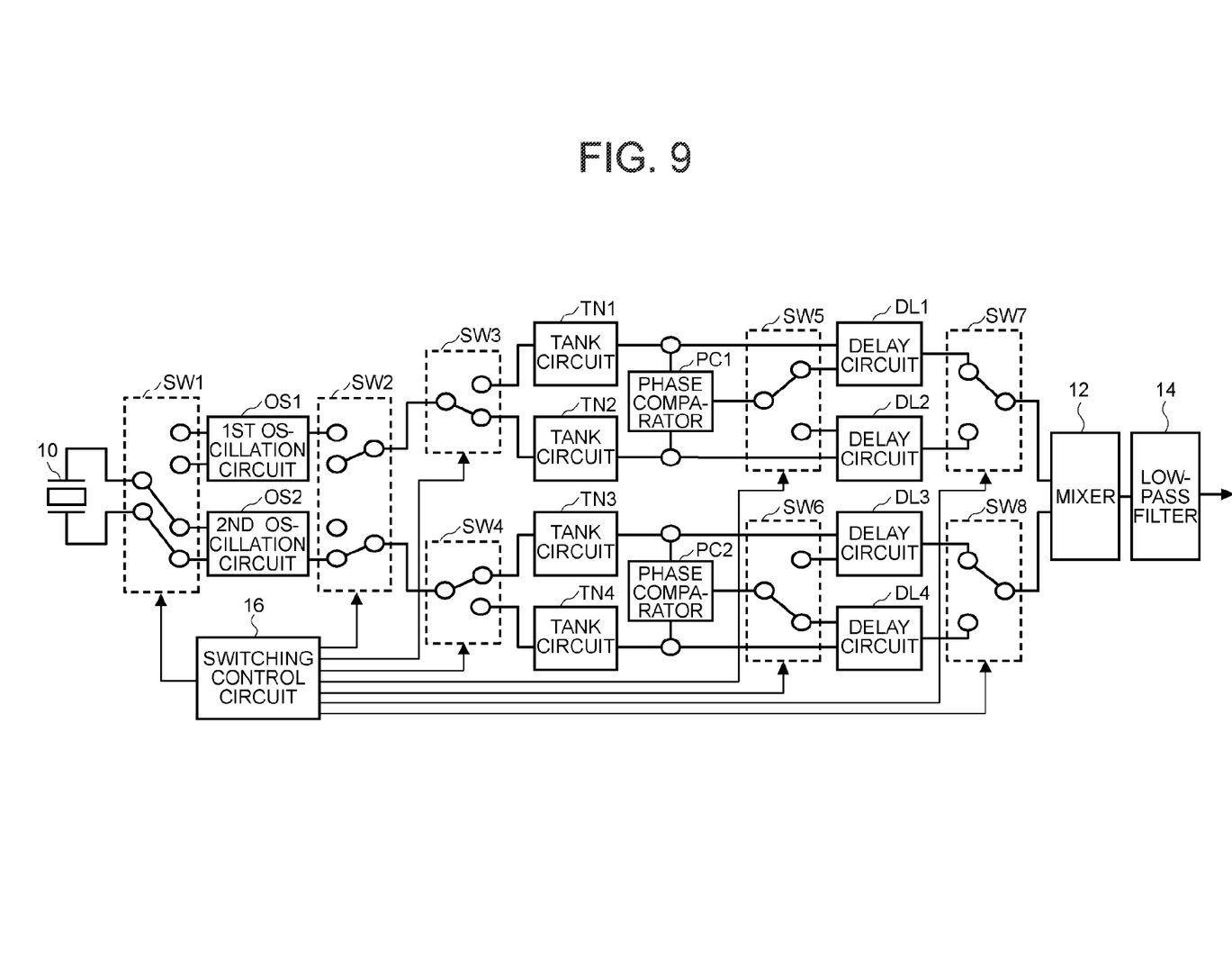
FIG. 9 is an explanatory diagram of the operation of the temperature sensor according to the first embodiment.

Further, the connecting destination of the crystal resonator 10 is changed to the first oscillation circuit OS1, on which occasion the switching circuits SW2 through SW8 of the temperature sensor take the status illustrated in FIG. 3 or the status illustrated in FIG. 9. It is timing (timing t1 etc) marked with "A" in FIG. 4 that the switching circuits SW2 through SW8 of the temperature sensor take the status illustrated in FIG. 3 when the connecting destination of the crystal resonator 10 is changed to the first oscillation circuit OS1. Moreover, it is timing marked with "B" in FIG. 4 that the switching circuits SW2 through SW8 of the temperature sensor take the status illustrated in FIG. 9 when the connecting destination of the crystal resonator 10 is changed to the first oscillation circuit OS1.

The following discussion will deal with an operation of the switching control circuit 16 from the timing t1.

When the switching control circuit 16 changes the connecting destination of the crystal resonator 10 to the first oscillation circuit OS1 at the timing t1, a portion configured by the crystal resonator 10 and the first oscillation circuit OS1 in the temperature sensor (see FIG. 3) starts operating as the first oscillator. The switching control circuit 16, when the status of the switching circuit SW1 is changed, does not change the statuses of other switching circuits SW2 through SW8 (FIG. 4).

Accordingly, even when the connecting destination of the crystal resonator 10 is changed to the first oscillation circuit OS1, as illustrated in FIGS. 3 and 4, it follows that the outputs of the tank circuit TN2 and the tank circuit TN4 continue to be inputted to the mixer 12 via the delay circuits DL2 and DL4. The outputs of the tank circuit TN2 and the tank circuit TN4 respectively become the signals having the same frequency as the frequency of the signals output from the first oscillator and the second oscillator (the crystal resonator 10 and the second oscillation circuit OS2). It therefore follows that the beat signal of the output signals of the first and second oscillators, which are different in terms of their frequencies, are output from the mixer 12, and the information (the low frequency components in the beat signal) indicating the frequency difference between the output signals of the first and second oscillators is output as temperature information from the lowpass filter 14.

As depicted in FIG. 4, the switching control circuit 16 changes the status of the switching circuit SW2 to a status ("OS1→SW3") of supplying the output of the first oscillation circuit OS1 to the switching circuit SW3 at timing t2 with an elapse of time τ1 from the timing t1. Note that the time τ1 connotes the time of which a value is determined to be equal to or longer than "the time required for the operation of the oscillation circuit to be stabilized after changing the connecting destination of the crystal resonator 10 to a certain oscillation circuit (OS1 or OS2)".

Further, the switching control circuit 16 changes the status of the switching circuit SW3 and the status of the switching circuit SW5 at the timing t2 (when the time τ1 elapses since the connecting destination of the crystal resonator 10 has been changed to the first oscillation circuit OS1). Namely, the switching control circuit 16 changes the status of the switching circuit SW3 to the status of supplying the signal coming from the switching circuit SW2 to the tank circuit TN1, and changes the status of the switching circuit SW5 to the status of supplying the control signal coming from the phase comparator PC1 to the delay circuit DL2.

Figure 5:
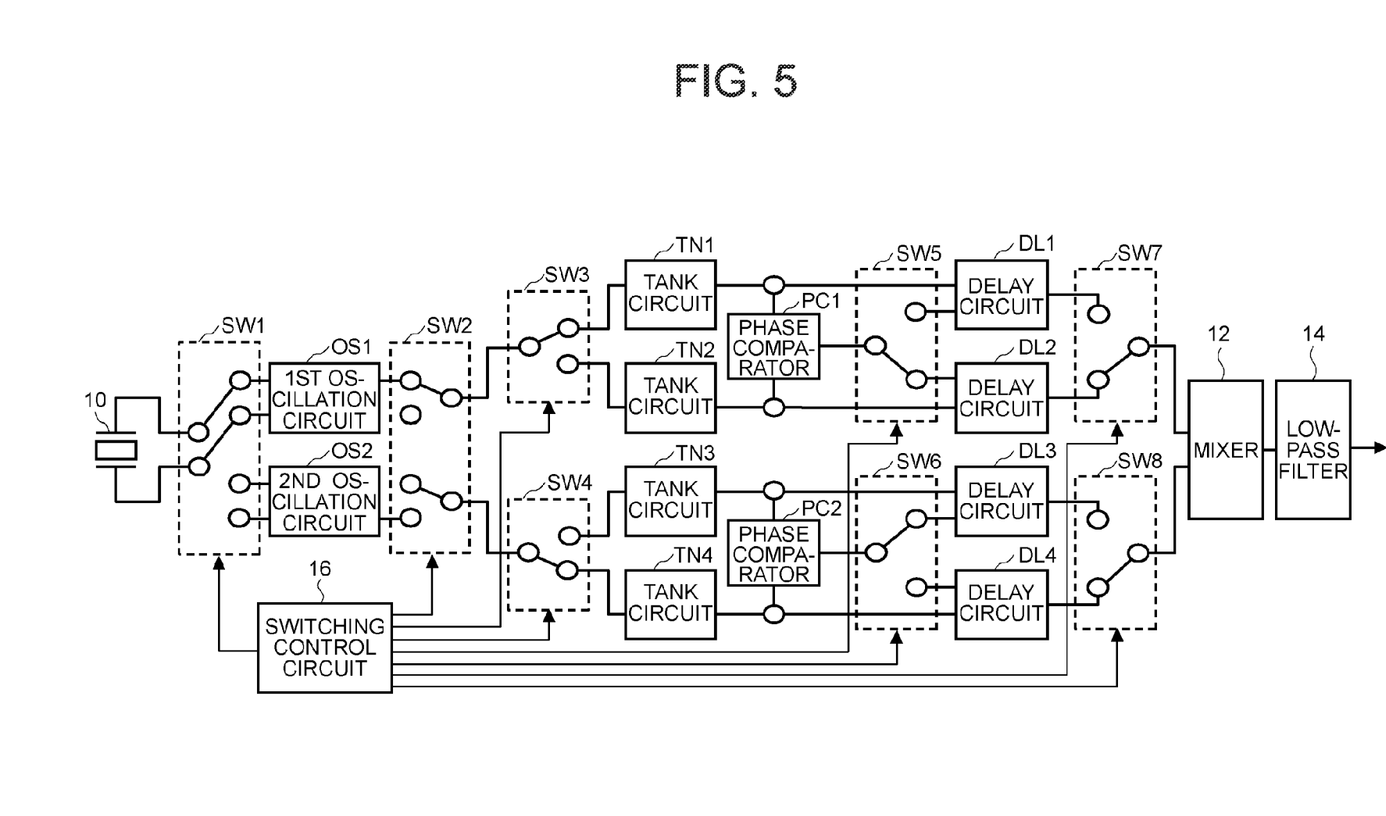
FIG. 5 is an explanatory diagram of an operation of the temperature sensor according to the first embodiment.

When the statuses of the switching circuits SW2, SW3 and SW5 are changed, as illustrated in FIG. 5, the output of the first oscillation circuit OS1 is supplied to the tank circuit TN1. The switching circuit SW7 is, however, in the status of supplying the signal coming from the delay circuit DL2 to the mixer 12. Therefore, the mixer 12 outputs, in the same way as before changing (switching over) the status of the switching circuit SW2 etc., the beat signal into which the output of the tank circuit TN2 and the output of the tank circuit TN4 are mixed. Moreover, the lowpass filter 14 also extracts the information indicating the frequency difference between the output signals of the first and second oscillators from the beat signal in the same way as before changing the status of the switching circuit SW2 etc, and outputs this information as the temperature information.

The circuits, which function when the output of the first oscillation circuit OS1 is supplied to the tank circuit TN1 and when the output of the tank circuit TN2 is supplied to the mixer 12, are the phase comparator PC1 and the delay circuit DL2.

Namely, as already described, the delay circuit DL2 is the circuit capable of controlling (changing) the delay time by the control signal. Further, the phase comparator PC1 is a circuit that detects a phase difference between the output of the tank circuit TN1 and the output of the tank circuit TN2, and outputs the signal having the level corresponding to the detection result. Further, the signal output by the phase comparator PC1 becomes, when supplied as the control signal to the delay circuit DL1 or DL2, a signal having such a level that the outputs of the two delay circuits DL1 and DL2 are in equiphase.

Accordingly, the output of the first oscillation circuit OS1 is supplied to the tank circuit TN1, while the output of the tank circuit TN2 is supplied to the mixer 12, in which case it follows that the output of the delay circuit DL2 is delayed so that the output of the delay circuit DL2 is in equiphase with the output of the delay circuit DL1.

As illustrated in FIG. 4, the switching control circuit 16 changes the status of the switching circuit SW7 at timing t3 with an elapse of the time ρ2 from the timing t2 (when changing the statuses of the switching circuits SW2, SW3 and SW5). Note that the "time τ2" connotes the time predetermined as a period of completion standby time for a process of making the phases of the signals coming from the two delay circuits coincident with each other (the process conducted by the delay circuit DL2 and the phase comparator PC1 in the case being described at the present).

Figure 6:
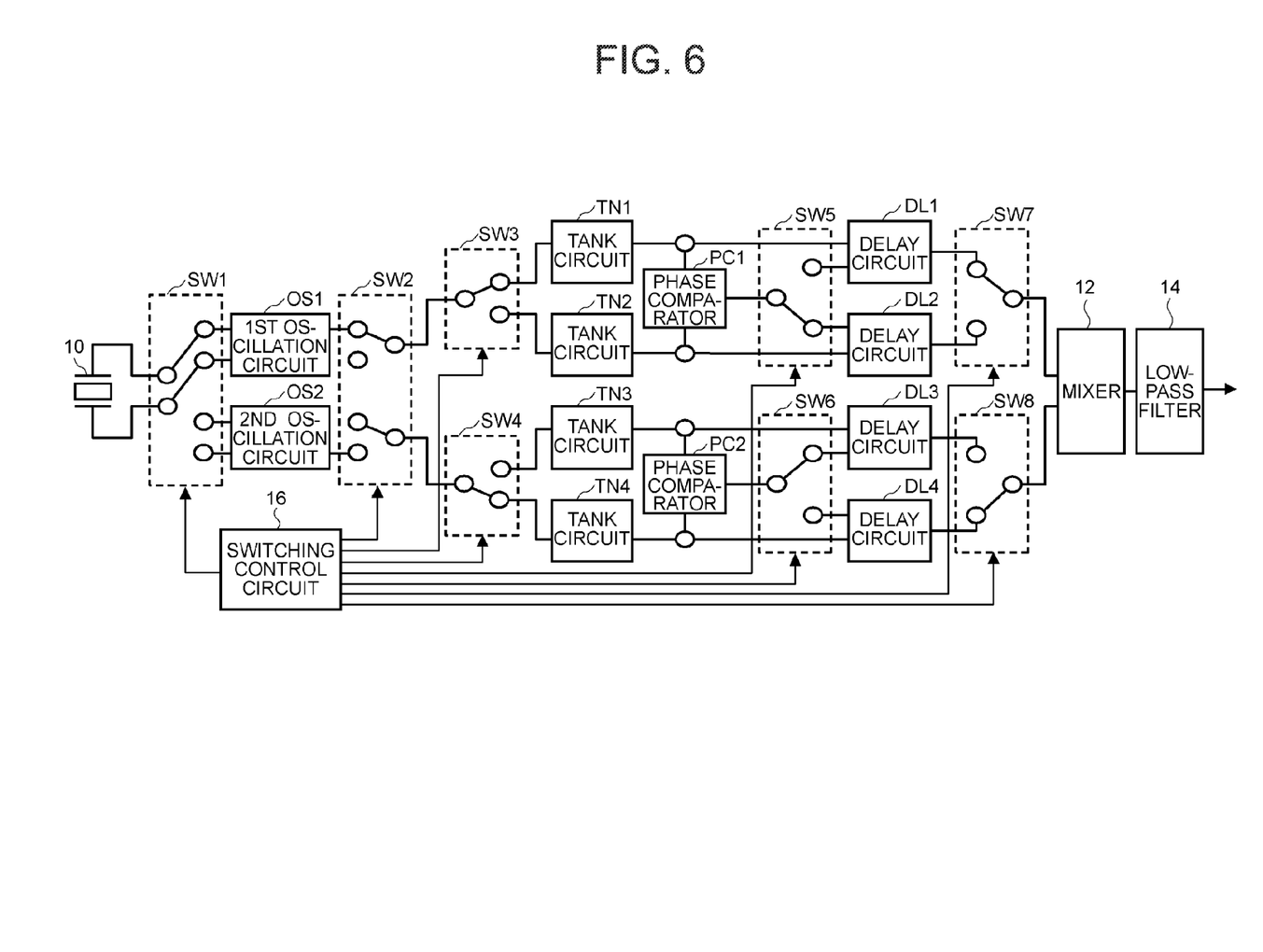
FIG. 6 is an explanatory diagram of the operation of the temperature sensor according to the first embodiment.

When the status of the switching circuit SW7 is changed, as depicted in FIG. 6, the output of the first oscillation circuit OS1 connected to the crystal resonator 10 is inputted to the mixer 12 via the delay circuit DL1 etc.

The status of each of the switching circuits on the side of the switching circuit SW8 remains unchanged, and hence it follows that the information indicating the frequency difference between the output signals of the first and second oscillators is output as the temperature information from the lowpass filter 14 even after changing the status of the switching circuit SW7.

As depicted in FIG. 4, the switching control circuit 16 changes only the status of the switching circuit SW1 without changing the statuses of other switching circuits when the time T elapses since the connecting destination of the crystal resonator 10 has been changed to the first oscillation circuit OS1 (when reaching the timing t4).

Figure 7:
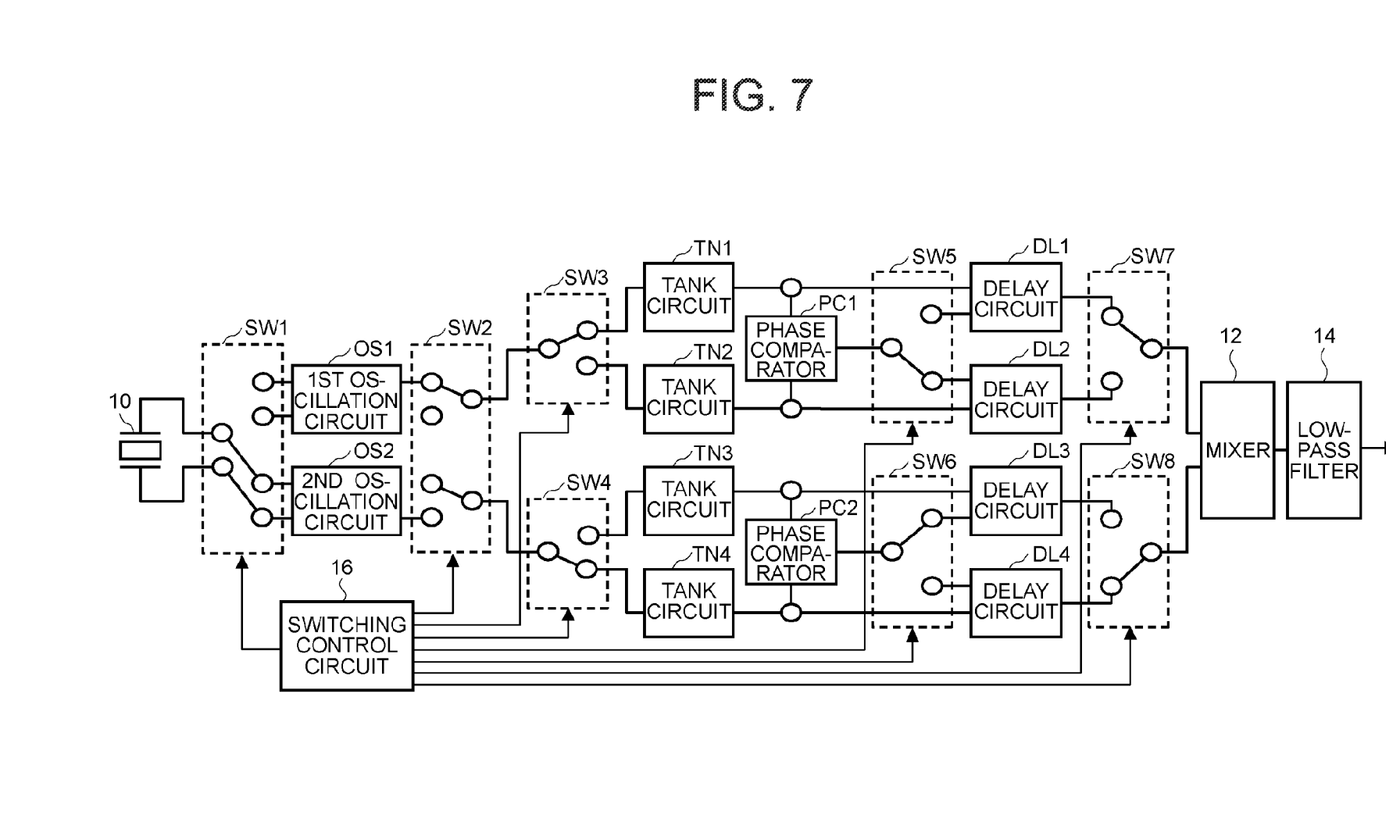
FIG. 7 is an explanatory diagram of the operation of the temperature sensor according to the first embodiment.

When only the status of the switching circuit SW1 is changed, as illustrated in FIG. 7, the crystal resonator 10 is connected to the second oscillation circuit OS2. As a result of this, the portion configured by the crystal resonator 10 and the second oscillation circuit OS2 starts operating as the second oscillator, however, the statuses of other switching circuits are not changed. Accordingly, it follows that the outputs of the tank circuit TN1 and the tank circuit TN4 continue to be inputted to the mixer 12 in the same way as done so far (see FIG. 4). Moreover, it follows that the information indicating the frequency difference between the output signals of the first and second oscillators is output as the temperature information from the lowpass filter 14.

The switching control circuit 16 changes the status of the switching circuit SW2 to a status ("OS2→SW4") of supplying the output of the second oscillation circuit OS2 to the switching circuit SW4 (at timing t5) when the time τ1 elapses since the connecting destination of the crystal resonator 10 has been changed to the second oscillation circuit OS2. Further, the switching control circuit 16 changes also the status of the switching circuit SW4 and the status of the switching circuit SW6 at the timing t5.

Figure 8:
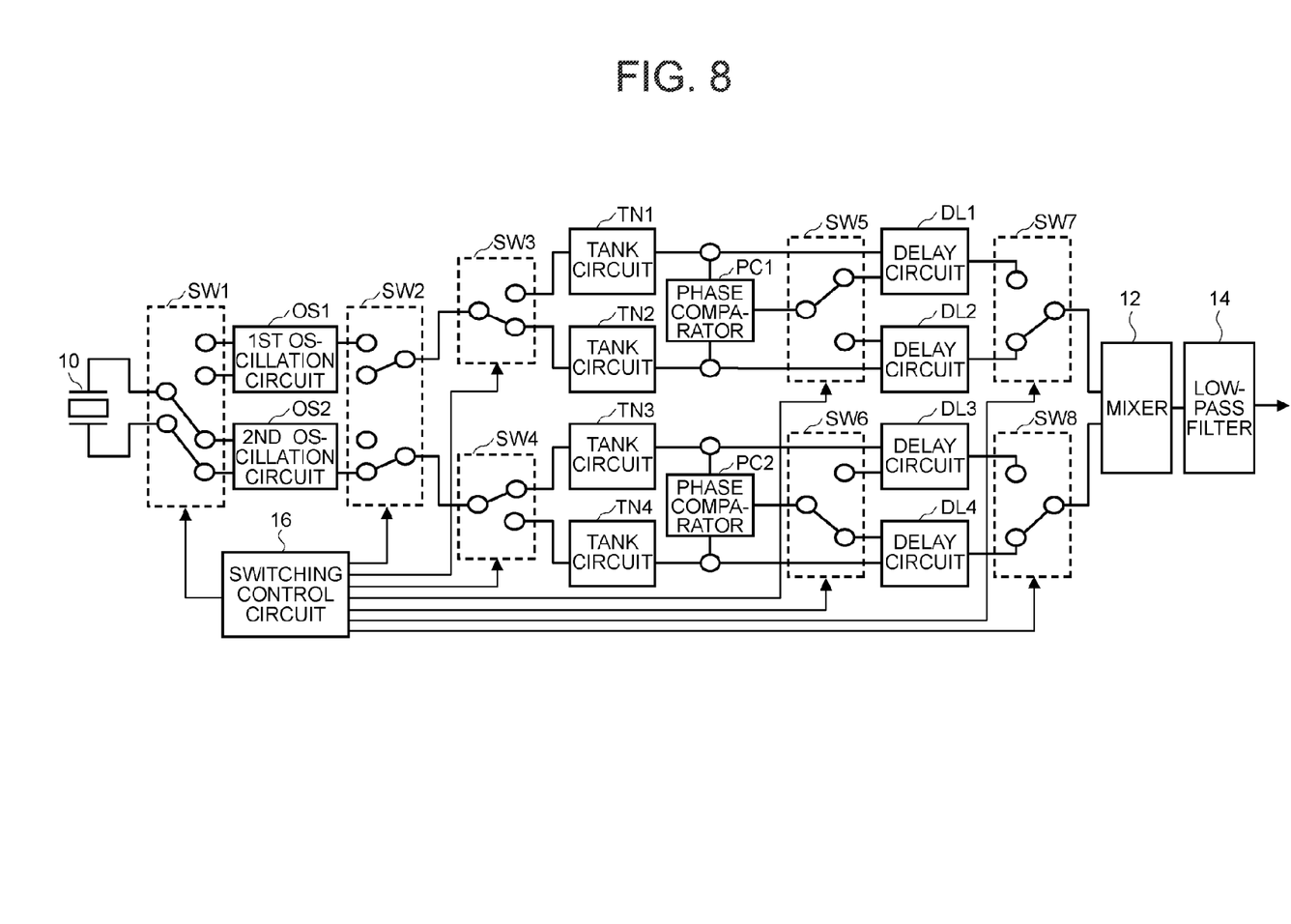
FIG. 8 is an explanatory diagram of the operation of the temperature sensor according to the first embodiment.

When the statuses of the switching circuits SW2, SW4 and SW6 are changed, as illustrated in FIG. 8, the output of the second oscillation circuit OS2 is supplied to the tank circuit TN3. The switching circuit SW8, however, supplies the signals coming from the side of the delay circuit DL4 to the mixer 12. Therefore, it follows that the mixer 12 continues the same operation as before changing (switching over) the status of the switching circuit SW2 etc.

As obvious from the circuit configuration of the temperature sensor that has already been described, the circuit configuration ranging from the switching circuit SW4 to the switching circuit SW8 is essentially the same as the circuit configuration ranging from the switching circuit SW3 to the switching circuit SW7. Accordingly, the output of the second oscillation circuit OS2 is supplied to the tank circuit TN3, while the output of the tank circuit TN2 is supplied to the mixer 12, in which case it follows that the phase comparator PC2 and the delay circuit DL4 delay the output signal of the delay circuit DL3 so that the output signal of the delay circuit DL4 is in equiphase with the output signal of the delay circuit DL3.

Then, as illustrated in FIG. 4, the switching control circuit 16, when the time τ2 elapses after changing the statuses of the switching circuits SW2, SW4 and SW6, changes the status of the switching circuit SW8.

Upon the change of the status of the switching circuit SW8, as depicted in FIG. 9, the output of the second oscillation circuit OS2 connected to the crystal resonator 10 is inputted to the mixer 12 via the tank circuit TN3 etc. Further, the tank circuit TN2 continues to output the signal having the same frequency as the frequency of the signal (the output signal of the first oscillation circuit OS1 connected to the crystal resonator 10) being inputted before changing the status of the switching circuit SW2 (see FIG. 4). Accordingly, it follows that the temperature information indicating the temperature of the crystal resonator 10 is output from the lowpass filter 14 also after changing the status of the switching circuit SW8.

The switching control circuit 16, when the time T elapses since the connecting destination of the crystal resonator 10 has been changed to the second oscillation circuit OS2, changes the connecting destination of the crystal resonator 10 to the first oscillation circuit OS1. Further, the switching control circuit 16 performs the control essentially having the same contents as those described above with respect to the switching circuits SW2, SW3, SW5 and SW7. It is to be noted that the phrase "the control essentially having the same contents" connotes "the control with the difference of only the status of the switching circuit SW3 etc after changing the status" (see FIG. 4).

Further, the switching control circuit 16, when the time T elapses since the connecting destination of the crystal resonator 10 has been changed to the first oscillation circuit OS1, changes the connecting destination of the crystal resonator 10 to the second oscillation circuit OS2. Subsequently, the switching control circuit 16 performs the control essentially having the same contents as those described above with respect to the switching circuits SW2, SW4, SW6 and SW8.

Accordingly, after conducting a series of control operations as described above and when the connecting destination of the crystal resonator 10 is again changed, it follows that the statuses of the switching circuits SW1 through SW8 of the temperature sensor return to those illustrated in FIG. 3.

As discussed above, the temperature sensor according to the first embodiment has the configuration in which the two oscillation circuits do not function simultaneously. And, if the two oscillation circuits do not function simultaneously, any adverse effect derived from interference does not occur, and hence the temperature sensor according to the first embodiment can be said to be the sensor capable of generating the temperature information from the oscillation frequency difference between the oscillators.

Moreover, the temperature sensor has the configuration of supplying, after the crystal resonator 10 has been connected to a certain oscillator (OS1 or OS2) and after waiting till the operation of the oscillator is stabilized, the output of this oscillator to the circuit at the subsequent stage. Further, the temperature sensor also has the configuration of delaying the signal being supplied underway to the mixer 12 so as to be in equiphase with the signal to be supplied from now onward before switching over the signal supplied to the mixer 12 (before changing the statuses of the switching circuits SW7, SW8).

Therefore, it follows that the temperature sensor according to the first embodiment is the sensor capable of outputting the accurate temperature information at all times (the sensor not outputting any abnormal temperature information when changing the statuses of the switching circuits SW1, SW7, SW8, etc.).

Second Embodiment

Figure 10:
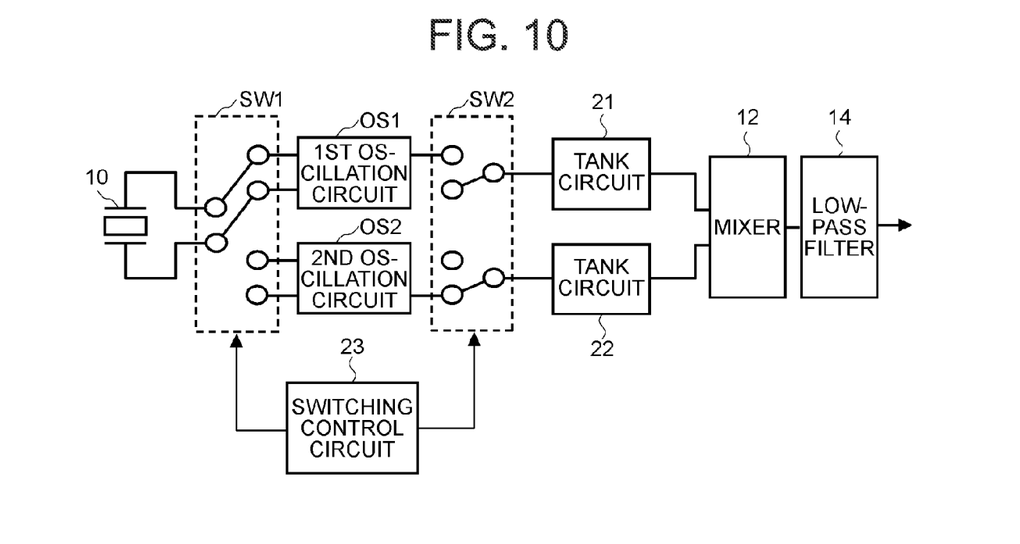
FIG. 10 is an explanatory diagram of an operation of the temperature sensor according to a second embodiment.

FIG. 10 illustrates a configuration of the temperature sensor byway of a second embodiment of the present invention.

The temperature sensor according to this second embodiment is a sensor developed for use in the case of not requiring the temperature information at arbitrary timing (which means that it is sufficient to periodically obtain the accurate temperature information).

As illustrated in FIG. 10, the temperature sensor according to the second embodiment includes the crystal resonator 10, the switching circuits SW1 and SW2, the first oscillation circuit OS1, the second oscillation circuit OS2, the mixer 12, the lowpass filter 14, tank circuits 21 and 22, and a switching control circuit 23.

The crystal resonator 10, the switching circuits SW1 and SW2, the first oscillation circuit OS1, the second oscillation circuit OS2, the mixer 12 and the lowpass filter 14 of the temperature sensor according to the second embodiment are the same components as the components having the same nomenclatures and the same reference numerals and symbols as those of the temperature sensor according to the first embodiment.

The switching control circuit 23 is a circuit (which controls only the switching circuits SW1, SW2 in the same way as the switching control circuit 16 does) corresponding to what excludes the control function over the switching circuits SW3 through SW8) from the switching control circuit 16. The tank circuits 21, 22 are, similarly to the tank circuit TN1 etc, resonance circuits which continue to output the signals having the same frequency as the frequency of the signals inputted so far for a fixed period of time even when the inputs cease. The tank circuits 21, 22 involve, however, using such a type of circuits that the time for outputting the signal having the same frequency as the frequency of the signal inputted so far after the input ceases is shorter than that of the tank circuit TN1 etc (normally slightly shorter than the time T).

As apparent from the configuration described above, this temperature sensor is configured to limit the time zone in which to output the accurate temperature information from the lowpass filter 14 (in which the accurate temperature information is not output from the lowpass filter 14 in each time zone containing a point of time when changing the status of the switching circuit SW2). The temperature sensor according to the second embodiment also, however, has the configuration in which the two oscillation circuits do not function simultaneously. It therefore follows that this temperature sensor also can generate the temperature information from the oscillation frequency difference between the oscillators without undergoing any adverse effect derived from the interference between the two oscillation circuits.

Third Embodiment

Figure 11:
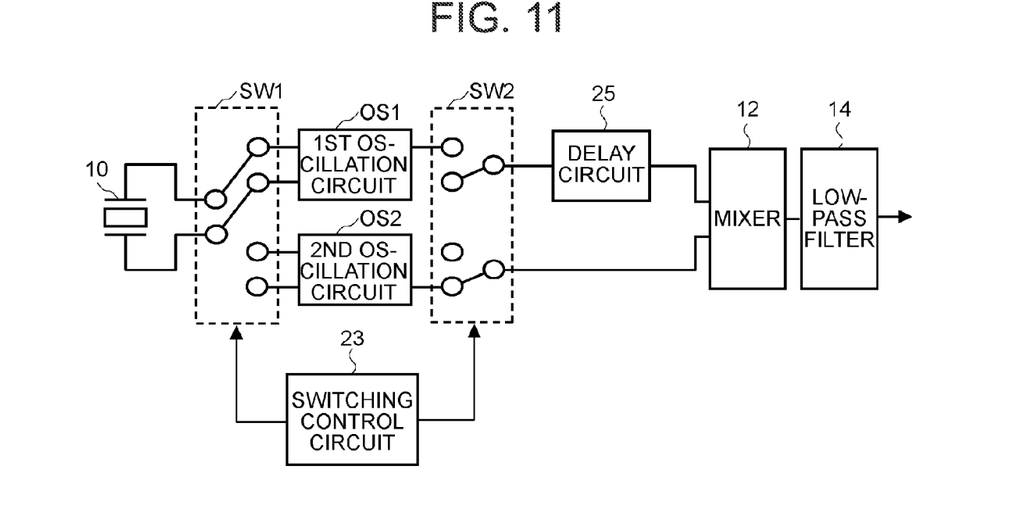
FIG. 11 is a diagram of a configuration of the temperature sensor according to a third embodiment.

FIG. 11 depicts a configuration of the temperature sensor by way of a third embodiment of the present invention.

The temperature sensor according to the third embodiment is also configured to be used in the case of not requiring the temperature information at the arbitrary timing (which means that it is sufficient to periodically obtain the accurate temperature information) similarly to the temperature sensor according to the second embodiment discussed above.

As illustrated in FIG. 11, the temperature sensor according to the third embodiment is configured by applying a modification of removing the tank circuit 22 and replacing the tank circuit 21 with a delay circuit 25 to the temperature sensor (FIG. 10) according to the second embodiment.

The delay circuit 25 is a circuit that delays the input signal to the same degree as the time T (=a switching period of the switching circuit SW1 by the switching control circuit 23).

In short, this temperature sensor is configured so that the signal output by the first oscillation circuit OS1 connected to the crystal resonator 10 is delayed by the delay circuit 25 and supplied to the mixer 12 substantially simultaneously with the signal output by the second oscillation circuit OS2 connected to the crystal resonator 10.

The accurate temperature information can be acquired even by adopting the configuration illustrated in FIG. 11. Further, the temperature sensor according to the third embodiment is also configured so that the two oscillation circuits do not function simultaneously. Accordingly, it follows that the temperature sensor according to the third embodiment also can generate the temperature information from the oscillation frequency difference between the oscillators without undergoing any adverse effect derived from the interference between the two oscillation circuits.

Fourth Embodiment

Figure 12:
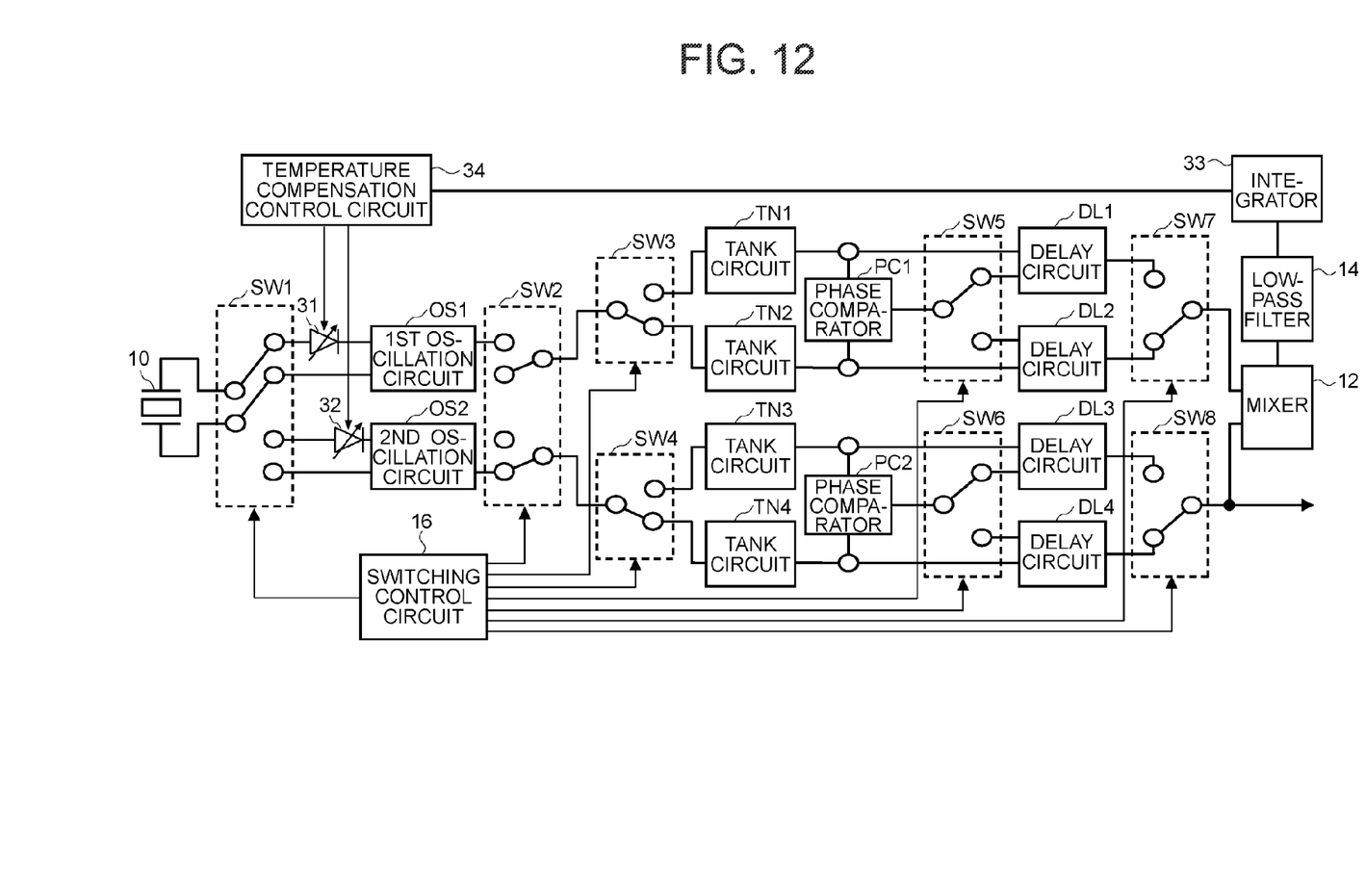
FIG. 12 is a diagram of a configuration of a temperature compensation oscillator according to a fourth embodiment.

FIG. 12 depicts a configuration of a temperature compensation oscillator by way of a fourth embodiment of the present invention. It should be noted that this temperature compensation oscillator is a device configured so that the output of the switching circuit SW8 is used as the output of the oscillator.

As obvious from a comparison between FIG. 12 and FIG. 3 etc, the temperature compensation oscillator according to the fourth embodiment is the device basically having the same configuration as the configuration of the temperature sensor according to the first embodiment discussed above.

As illustrated in FIG. 12, however, a variable capacity diode 31 is provided between the first switching circuit SW1 and the first oscillation circuit OS1 of the temperature compensation oscillator, and a variable capacity diode 32 is provided between the first switching circuit SW1 and the second oscillation circuit OS2 of the temperature compensation oscillator. Further, the temperature compensation oscillator includes an integrator 33 that integrates the output of the lowpass filter 14.

Moreover, the temperature compensation oscillator includes a temperature compensation control circuit 34 that controls the output variable capacity diodes 31, 32 so that the signal having a predetermined frequency is output from each oscillator (a circuit configured by combining the crystal resonator 10 and the oscillation circuit OS1 or OS2 not depending on the temperature but based on the output of the integrator 33.

In short, as already described, the temperature sensor according to the first embodiment is configured to enable the outputting of the accurate temperature information (the low frequency components in the beat signal output from the mixer 12) on the crystal resonator 10 at all times in such a form that the first oscillation circuit OS1 and the second oscillation circuit OS2 do not function simultaneously. Moreover, the temperature compensation oscillator according to the fourth embodiment has the configuration to compensate the temperature on the basis of the temperature information. Accordingly, it follows that the temperature compensation oscillator according to the fourth embodiment is configured to enable the temperature of the oscillator to be compensated preferably without being affected by the adverse effect due to the interference between the two oscillation circuits.

Modified Mode

The devices (the temperature sensor, the temperature compensation oscillator) described above can be modified in a variety of modes. For example, the components from the switching circuit SW2 onward in the temperature sensor (FIG. 3) according to the first embodiment can be replaced with circuits configured by an AND converter, a processor, etc that have the same functions. Further, each of the temperature sensor and the temperature compensation oscillator can be modified into a device using a ceramic resonator as a substitute for the crystal resonator 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A temperature sensor, comprising:
a resonator;
a first oscillation circuit to oscillate the resonator in a first oscillation mode;
a second oscillation circuit to oscillate the resonator in a second oscillation mode different from the first oscillation mode;
a switching circuit to connect the resonator to the first oscillation circuit or the second oscillation circuit;
a control circuit to control the switching circuit so that the first oscillation circuit and the second oscillation circuit are alternately connected to the resonator;
a temperature information output circuit to generate information representing a frequency difference between a signal output from the first oscillation circuit kept in a status of being connected to the resonator and a signal output from the second oscillation circuit kept in the status of being connected to the resonator on the basis of these signals and to output the frequency difference information as temperature information on the resonator;
first through fourth tank circuits;
a first switching circuit to supply the signal output from the first oscillation circuit to the first tank circuit or the second tank circuit;
a second switching circuit to supply the signal output from the second oscillation circuit to the third tank circuit or the fourth tank circuit;
a third switching circuit to supply the signal output from the first tank circuit or the second tank circuit to the temperature information output circuit; and
a fourth switching circuit to supply the signal output from the third tank circuit or the fourth tank circuit to the temperature information output circuit,
wherein the control circuit executes a first control process of controlling the first switching circuit to change a supply destination of the signal output from the first oscillation circuit when a connecting destination of the resonator is switched over to the first oscillation circuit, a third control process of controlling the third switching circuit so that the signal output from the tank circuit becoming the supply destination of the signal output from the first oscillation circuit in the first control process is supplied to the temperature information output circuit, a second control process of controlling the second switching circuit to change the supply destination of the signal output from the second oscillation circuit when the connecting destination of the resonator is switched over to the second oscillation circuit, and a fourth control process of controlling the fourth switching circuit so that the signal output from the tank circuit becoming the supply destination of the signal output from the second oscillation circuit in the second control process is supplied to the temperature information output circuit, and wherein the temperature information output circuit includes a mixer that mixes the two signals supplied from the third switching circuit and the fourth switching circuit.

2. The temperature sensor according to claim 1, wherein the control circuit executes the first control process when a first period of time elapses since a point of time when the connecting destination of the resonator is switched over to the first oscillation circuit, and executes the second control process when the first period of time elapses since a point of time when the connecting destination of the resonator is switched over to the second oscillation circuit.

3. A temperature compensation oscillator comprising the temperature sensor according to claim 1, wherein a temperature of the resonator is compensated based on the temperature information, and there is output a signal having a frequency, which is generated by a first oscillator including the resonator and the first oscillation circuit or by a second oscillator including the resonator and the second oscillation circuit.

4. A temperature sensor, comprising:
a resonator;
a first oscillation circuit to oscillate the resonator in a first oscillation mode;
a second oscillation circuit to oscillate the resonator in a second oscillation mode different from the first oscillation mode;
a switching circuit to connect the resonator to the first oscillation circuit or the second oscillation circuit;
a control circuit to control the switching circuit so that the first oscillation circuit and the second oscillation circuit are alternately connected to the resonator;
a temperature information output circuit to generate information representing a frequency difference between a signal output from the first oscillation circuit kept in a status of being connected to the resonator and a signal output from the second oscillation circuit kept in the status of being connected to the resonator on the basis of these signals and to output the frequency difference information as temperature information on the resonator;

first through fourth tank circuits;
a first switching circuit to supply the signal output from the first oscillation circuit to the first tank circuit or the second tank circuit;
a second switching circuit to supply the signal output from the second oscillation circuit to the third tank circuit or the fourth tank circuit;
first through fourth delay circuits to be enabled to control delay quantities of inputted signals that are output respectively from the first through fourth tank circuits;
a third switching circuit to supply the signal output from the first tank circuit or the second tank circuit to the temperature information output circuit; and
a fourth switching circuit to supply the signal output from the third tank circuit or the fourth tank circuit to the temperature information output circuit,
wherein the control circuit executes a first control process of controlling the first switching circuit to change a supply destination of the signal output from the first oscillation circuit when a connecting destination of the resonator is switched over to the first oscillation circuit, a first phase adjusting process of controlling a delay quantity of the other delay circuit to eliminate a phase difference between a signal output from one delay circuit in the first and second delay circuits, which is connected to the tank circuit becoming the supply destination of the signal output from the first oscillation circuit in the first control process and a signal output from the other delay circuit in the first and second delay circuits, and a third control process of controlling the third switching circuit so that the signal output from the delay circuit connected to the tank circuit becoming the supply destination of the signal output from the first oscillation circuit in the first control process is supplied to the temperature information output circuit in this sequence; and
the control circuit further executes a second control process of controlling the second switching circuit to change the supply destination of the signal output from the second oscillation circuit when the connecting destination of the resonator is switched over to the second oscillation circuit, a second phase adjusting process of controlling a delay quantity of the other delay circuit to eliminate a phase difference between a signal output from one delay circuit in the third and fourth delay circuits, which is connected to the tank circuit becoming the supply destination of the signal output from the second oscillation circuit in the second control process and a signal output from the other delay circuit in the third and fourth delay circuits, and a fourth control process of controlling the fourth switching circuit so that the signal output from the delay circuit connected to the tank circuit becoming the supply destination of the signal output from the second oscillation circuit in the second control process is supplied to the temperature information output circuit in this sequence.

5. The temperature sensor according to claim 4, further comprising:
a first phase comparing circuit to detect a phase difference between the signal output from the first tank circuit and the signal output from the second tank circuit and to output a control signal of a delay quantity corresponding to a detection result;
a second phase comparing circuit to detect a phase difference between the signal output from the third tank circuit and the signal output from the fourth tank circuit and to output a control signal of a delay quantity corresponding to a detection result;
a fifth switching circuit to supply the control signal output from the first phase comparing circuit to the first delay circuit or the second delay circuit; and
a sixth switching circuit to supply the control signal output from the second phase comparing circuit to the third delay circuit or the fourth delay circuit,
wherein the first phase adjusting process and the second phase adjusting process executed by the control circuit are processes of controlling the fifth switching circuit and the sixth switching circuit, respectively.

6. A temperature compensation oscillator comprising the temperature sensor according to claim 4, wherein a temperature of the resonator is compensated based on the temperature information, and there is output a signal having a frequency, which is generated by a first oscillator including the resonator and the first oscillation circuit or by a second oscillator including the resonator and the second oscillation circuit.

* * * * *